LINEAR SAW-TOOTH WAVE GENERATOR

Filed May 14, 1956

INVENTOR.
DOUGLAS J. HAMILTON,
BY [signature]
ATTORNEY.

2,814,736
Patented Nov. 26, 1957

2,814,736

LINEAR SAW-TOOTH WAVE GENERATOR

Douglas J. Hamilton, Santa Monica, Calif., assignor to Hughes Aircraft Company, Culver City, Calif., a corporation of Delaware Application May 14, 1956, Serial No. 584,681

2 Claims. (Cl. 307—88.5)

Figure 1:
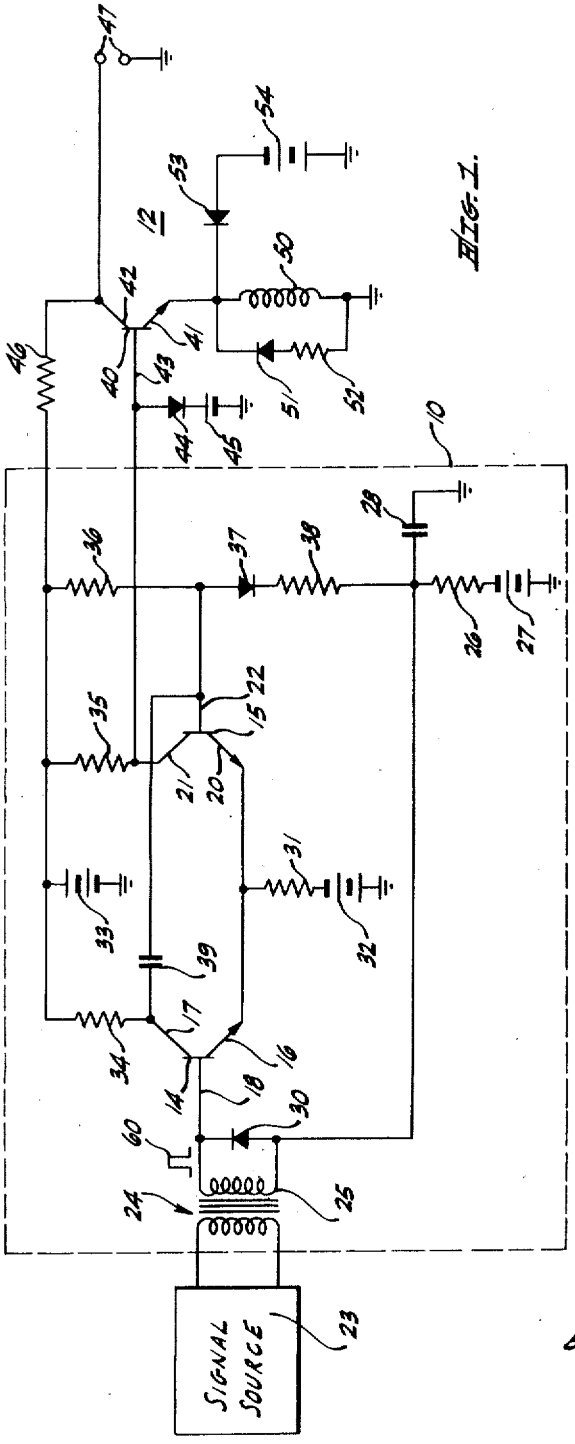

This invention relates generally to relaxation oscillators, and more particularly relates to a saw-tooth current wave generator employing a transistor as the active circuit element.

A saw-tooth wave generator finds use in various fields. For example, in order to deflect a cathode ray periodically across a target a saw-tooth current or voltage is required for the deflection system, which may be either electromagnetic or electrostatic. Furthermore, saw-tooth waves are needed in various analogue devices or generally whereever a linear time base is required. In most of these applications it is essential that the saw-tooth wave be linear or at least that its deviation from linearity does not exceed a few percent. While it is relatively easy to change a saw-tooth current wave into a saw-tooth voltage wave, the reverse procedure is not nearly as easy. In the presence of an appreciable capacitive load it is difficult to derive a linear saw-tooth current from a saw-tooth voltage.

In the past saw-tooth waves have been derived from various species of bootstrap circuits which makes use of a cathode follower action. Furthermore, in the prior art phantastron circuits have been proposed to this end. These circuits utilize the Miller effect. A discussion of these circuits may be found in volume 19, Radiation Laboratories Series entitled "Wave Forms" published in 1949 by McGraw-Hill Book Company, Inc., New York, New York. The above-mentioned circuits all require conventional vacuum tubes. However, in some applications it is desirable to provide a transistor circuit for developing the saw-tooth wave. Transistors may be preferred for their well-known advantages of small weight and low voltage requirements, or they may be necessary because the remainder of the electronic circuit requires transistors.

It is accordingly an object of the present invention to provide a saw-tooth wave generator which will develop a substantially linear saw-tooth current or voltage.

A further object of the invention is to provide a relaxation oscillator of the type referred to employing transistors as the active circuit element and having a very fast retrace.

Another object of the invention is to provide a transistor circuit for developing a saw-tooth current which is reliable and requires relatively few circuit components.

A saw-tooth wave generator in accordance with the present invention comprises a junction transistor. A source of square-topped waves is coupled to the base of the transistor. Preferably the square-topped wave source comprises a monostable circuit which may include two junction transistors. An output circuit is coupled to the collector of the transistor while an inductor is connected to its emitter. The transistor is operated in such a manner that it is substantially non-conducting when the square-topped wave impressed on its base has a first voltage level and becomes conducting when the square-topped wave has a second voltage level. At that time a substantially constant voltage is applied across the inductor. As a result of this constant voltage the rate of change of current through the emitter inductor is constant, and a corresponding saw-tooth current may be derived from the collector. If a suitable load impedance is coupled to the collector it will be obvious that a saw-tooth voltage may be obtained. Either the saw-tooth voltage or the saw-tooth current are substantially linear.

Figure 2:
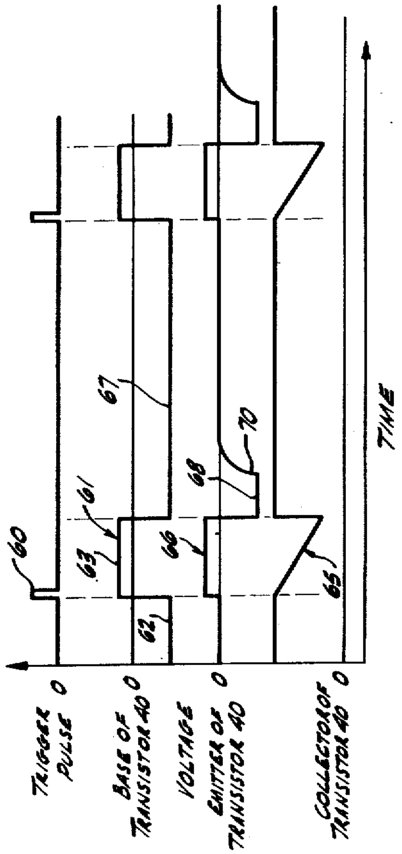

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Fig. 1 is a circuit diagram of a saw-tooth wave generator embodying the present invention; and Fig. 2 is a graph illustrating voltages obtained at various points of the circuit of Fig. 1 plotted as a function of time.

Referring now to the drawing and particularly to Fig. 1, there is illustrated a saw-tooth wave generator in accordance with the invention comprising a monostable circuit 10 indicated by dotted lines for developing a square-topped wave and a saw-tooth wave generator generally indicated at 12. The monostable circuit 10 may be of any conventional type but preferably includes a pair of junction transistors 14 and 15. Transistor 14 includes an emitter 16, a collector 17 and a base 18 while transistor 15 has an emitter 20, a collector 21 and a base 22. As shown by the accepted symbols transistors 14 and 15 are N–P–N junction transistors. However, it will be perfectly obvious that P–N–P transistors may be used instead, in which case the polarity of all voltages and diodes should be reversed.

The monostable circuit 10 may be supplied with trigger pulses by a signal source schematically shown at 23. The output of the signal source 23 includes a transformer 24 having a secondary winding 25, one terminal of which is connected to the base 18. The other terminal of secondary winding 25 is grounded through resistor 26 and battery 27, the latter being poled to supply a negative voltage to base 18. A by-pass capacitor 28 may be connected across resistor 26 and battery 27. A diode 30 has its cathode connected to base 18 and its anode to resistor 26. In other words, diode 30 is connected across secondary winding 25. It may be observed that diode 30 has been shown by its conventional symbol, the direction of the arrow indicating the direction of flow of conventional current. Preferably diode 30 is a crystal diode such as a germanium diode.

The two emitters 16 and 20 are tied together and grounded through resistor 31 and battery 32, which is poled to supply a negative voltage to the two emitters. Collector 17 is connected to a suitable source of positive voltage such as battery 33 through resistor 34, the negative terminal of battery 33 being grounded. Collector 21 is connected to the positive terminal of battery 33 through resistor 35. A coupling capacitor 39 is used for connecting emitter 17 to base 22. Furthermore, base 22 is connected to a voltage divider including resistor 36 connected to battery 33, diode 37 which may again be a crystal diode and resistor 28, which in turn is connected to the junction point of resistor 26 and bypass capacitor 28. Base 22 is connected to the junction point of resistor 36 and diode 37. It will be obvious that the combination of battery 33, resistor 36, diode 37, resistors 38, 26 and battery 27 form a voltage divider and that voltage normally flows from battery 33 to battery 27 in the conventional direction of current flow.

The monostable circuit which has just been described is conventional. Monostable multivibrators of this type have been described on page 502 with particular reference to Figs. 12–64 of Transistor Electronics by Lo, Enders, Zawels, Waldhauer, and Cheng, published in 1955 by Prentice-Hall, Inc., Inglewood Cliffs, New Jersey. A similar circuit is disclosed in the patent of Toth, 2,641,717, issued on June 9, 1953. As pointed out hereinbefore, other monostable multivibrators may be substituted for circuit 10 in Fig. 1.

The saw-tooth wave generator 12 of the present invention includes a transistor 40 which is shown as a junction transistor of the N–P–N type. However, as explained hereinbefore, a P–N–P transistor may be substituted therefor if all the voltages and diodes are reversed. Transistor 40 includes an emitter 41, collector 42 and base 43. Base 43 is directly connected to collector 21 of transistor 15. A clamping circuit including diode 44 and battery 45 is connected between base 43 and ground. Battery 45 is poled to supply a positive voltage to base 43. Collector 42 is connected to battery 33 through a load impedance element such as resistor 46. A pair of output terminals 47 is connected between collector 42 and ground.

In accordance with the present invention an inductor 50 is connected between emitter 41 and ground. A damping circuit including diode 51 and resistor 52 is connected across inductor 50 to provide critical damping. A clamping circuit including diode 53 and battery 54 is connected across inductor 50, that is, between emitter 41 and ground. Battery 54 supplies a negative voltage to emitter 41.

The operation of the monostable multivibrator 10 will be explained first by assuming that transistor 15 is normally conducting while transistor 14 is normally non-conducting. As is well known, an N–P–N junction transistor tends to conduct when its emitter is negative with respect to the base. We may assume that battery 33 provides a voltage of +10 volts while that of battery 27 is −10 volts. Accordingly, if current flows through the voltage divider consisting of resistor 36, diode 37, resistors 38, 26, we will assume that base 22 is at a voltage which is positive with respect to that of battery 32; namely, −4 volts, for example. As a result transistor 15 will conduct. Since a portion of the transistor current will flow through resistor 31, emitter 16 will have a voltage above −10 volts. In the absence of conduction of transistor 14, base 18 will be supplied from the divider consisting of resistors 26, 38, 36, and diode 37 with a voltage which is approximately −5 volts. Accordingly transistor 14 will not conduct.

Upon the arrival of a positive trigger pulse 60 from signal source 23, as shown in Fig. 1 and also in Fig. 2, base 18 will become positive with respect to emitter 16 to an extent to permit transistor 14 to conduct. Immediately the current flowing through resistor 34 will develop a voltage drop which is impressed through coupling capacitor 39 on base 22. This negative voltage supplied to the base of transistor 15 will cause a reduction of its conduction and consequently less current flows through emitter resistor 31. This in turn permits the voltage of emitter 16 to become more negative, thus increasing the conduction of transistor 14. This regenerative process continues until very rapidly transistor 14 is fully conducting while transistor 15 is cutoff.

Upon the arrival of the trailing edge of trigger pulse 60, the voltage at base 18 is suddenly reduced. This in turn will bias diode 30 in the forward direction and permit it to conduct. Consequently the voltage of base 18 is prevented from going in a negative direction and cutoff the conduction of transistor 14. Transistor 14 will continue to conduct until the negative charge impressed on coupling capacitor 39 leaks off. This occurs in a period of time determined by the resistor 36, capacitor 39, and the current flowing through resistor 36. After this time has elapsed, transistor 15 again begins to conduct while transistor 14 is non-conducting. During the time transistor 15 is non-conducting diode 37 is biased in a non-conductive direction because the voltage impressed on base 22 is below that of the junction point of diode 37 and resistor 38. In other words, during that period of time battery 27 is disconnected from base 22.

The voltage developed across collector resistor 35 is plotted as curve 61 in Fig. 2. This voltage also appears at the base 43 of transistor 40. In other words, normally when transistor 15 conducts the voltage of base 43 is as shown at 62 and may be of the order of −3 volts. In response to the arrival of a trigger pulse 60 transistor 14 conducts while transistor 15 becomes non-conducting and the voltage of base 43 goes positive as shown at 63, and may be of the order of +2 volts. This voltage is clamped by means of diode 44 and battery 45, which may have a voltage of +2 volts. When diode 44 is biased in the forward direction it provides in effect a low-impedance voltage source and its purpose is both to clamp the voltage of base 43 to the value of the voltage supplied by battery 45 and to supply current to transistor 40.

Normally, that is as long as transistor 15 conducts, transistor 40 is non-conducting. This will be obvious because emitter 41, in the absence of current flow, will be at ground potential while base 43 is held at a negative voltage. In that case diode 53 is biased in the non-conducting direction. On the other hand, base 43 is at a negative potential which may be of the order of −3 volts as explained above. Accordingly, diode 44 is also biased in the non-conducting direction.

Assuming now that a trigger pulse is applied to base 18 to cause transistor 14 to conduct while transistor 15 becomes non-conducting. As explained above a positive voltage 63 appears at collector 21 which is impressed on base 43. Since emitter 41 was at ground potential this constant positive voltage is now impressed across inductor 50. Under these conditions the rate of change of the current through inductor 50 will be constant. In other words, a linearly increasing current will flow from emitter 41 through inductor 50. This current will also flow through load 46 to provide a saw-tooth output current. If the load 46 is resistive and of sufficient resistance a voltage such as shown at 65 in Fig. 2 is developed. Curve 66 illustrates the voltage at emitter 41. As explained above the voltage of base 43 is maintained constant by the clamping circuit 44, 45 and this low impedance clamping circuit also furnishes part of the current for the transistor.

Conduction of transistor 40 continues with a linear increase in current until the voltage at base 43 again drops to its previous negative value as shown at 67 in Fig. 2. At the same time the voltage of emitter 41 follows as shown at 68. The voltage drop at the emitter 41 is limited in a negative direction by battery 54 and diode 53. In this manner the negative voltage of emitter 41 may be limited or clamped to a value of, for example, −2 volts. Diode 51 and resistor 52 are designed to provide critical damping for inductor 50. The time of recovery of inductor 50 is determined by the distributed capacitance of inductor 50, stray capacitance and the resistance of clamping resistor 52. These values can be selected to provide a short-time constant. The recovery time is illustrated by curve portion 70 in Fig. 2.

It will be obvious that as soon as the voltage of emitter 41 has reached again the zero level, as shown by curve 66 the saw-tooth wave generator 12 may be triggered again. As pointed out hereinbefore, a linearly increasing current wave shape may be obtained from output terminals 47. If a resistor 46 of suitable resistance is provided, a corresponding saw-tooth voltage wave may be obtained. Since the output wave is essentially a current any kind of loading may be provided without changing the linearity of the output wave.

The linearity of the output wave 65 is a function of $r_e+R_b(1-a)$, the voltage of battery 45, and the inductance of inductor 50, wherein $r_e$ is the resistance in the emitter circuit of transistor 40, *a* is the current gain of transistor 40 and $R_b$ is the base resistance of the transistor plus the dynamic resistance of diode 44. The departure from linearity of the output current wave of the circuit of the invention may be 1.5 percent and may be made smaller if the inductance of inductor 50 is made larger; or if the resistances in the base or emitter circuit are decreased.

While it will be understood that the circuit specifications of the saw-tooth wave generator of the invention may vary according to the design for any particular application, the following circuit specifications are included by way of example only as suitable for a trace period of 5 microseconds:

| | |
|---|---|
| Transistor **14** | 5 milli-henries |
| Transistor **15** | 2N94A (N-P-N) |
| Transistor **40** | 2N94A (N-P-N) |
| Battery **33** | 2N94A (N-P-N) |
| Battery **32** | +10 volts |
| Battery **27** | −10 volts |
| Battery **45** | −10 volts |
| Battery **54** | +2 volts |
| Resistor **34** | 2,700 ohms |
| Resistor **35** | 30,000 ohms |
| Resistor **36** | 620 ohms |
| Resistor **31** | 1,000 ohms |
| Resistor **38** | 10,000 ohms |
| Resistor **26** | 3,000 ohms |
| Resistor **46** | 510 micro-microfarads |
| Capacitor **39** | 1 microfarad |
| Capacitor **28** | −2 volts |
| Inductor **50** | 2,700 ohms |

With the above values the current derived from collector 42 is between zero and 5 milliamperes, the trace period is 5 microseconds, the retrace period between 0.1 and 0.5 microsecond and the departure from linearity is 1.5 percent.

The extremely fast retrace period of the circuit of the invention is due to the fact that the retrace time is determined essentially by the switching time of the monostable circuit 10, and the stray capacitance of inductor 50. It may also be mentioned that when transistor 40 is conducting it operates in the common base connection, and hence the output waveform is almost completely isolated from the remainder of the circuit.

There has thus been disclosed an improved saw-tooth current generator utilizing a junction transistor as its active circuit element. The circuit provides a very linear output current or voltage wave and has a very fast retrace time. The departure from linearity is of the order of one percent.

What is claimed is:

1. A saw-tooth wave generator comprising a monostable multivibrator including a first and a second transistor, said second transistor having a collector, a voltage divider including a source of voltage, a first resistor and a crystal diode connected in series, the junction point of said first resistor and crystal diode being connected to the collector of said second transistor; a junction transistor having a base, a collector, and an emitter, said junction point of said first resistor and crystal diode being connected to said base, a second resistor connected between said source of voltage and the collector of said junction transistor, a source of reference voltage, an inductor connected between said emitter and said source of reference voltage, a further source of voltage, and a further crystal diode connected in series across said inductor, said multivibrator being arranged to change from its stable to its astable state in response to the application of a trigger pulse, whereby said junction transistor conducts and a substantially constant voltage is applied across said inductor to develop a saw-tooth current wave across said second resistor.

2. A saw-tooth wave generator comprising a monostable multivibrator including a first and a second transistor, said second transistor having a collector, a voltage divider including a source of voltage, a first resistor and a crystal diode connected in series, the junction point of said first resistor and crystal diode being connected to the collector of said second transistor; a junction transistor having a base, a collector, and an emitter, said junction point of said first resistor and crystal diode being connected to said base, a second resistor connected between said source of voltage and the collector of said junction transistor, a source of reference voltage, an inductor connected between said emitter and said source of reference voltage, a damping circuit connected across said inductor, a further source of voltage, and a further crystal diode connected in series across said inductor, said multivibrator being arranged to change from its stable to its astable state in response to the application of a trigger pulse, whereby said junction transistor conducts and a substantially constant voltage is applied across said inductor to develop a saw-tooth current wave across said second resistor.

References Cited in the file of this patent

UNITED STATES PATENTS

| | | |
|---|---|---|
| 2,508,879 | Zagor | May 23, 1950 |
| 2,562,188 | Hance | July 31, 1951 |
| 2,594,336 | Mohr | Apr. 29, 1952 |
| 2,605,306 | Eberhard | July 29, 1952 |
| 2,622,212 | Anderson | Dec. 16, 1952 |
| 2,673,936 | Harris | Mar. 30, 1954 |
| 2,728,857 | Sziklai | Dec. 27, 1955 |

UNITED STATES PATENT OFFICE

Certificate of Correction

Patent No. 2,814,736 November 26, 1957

Douglas J. Hamilton

It is hereby certified that error appears in the printed specification of the above numbered patent requiring correction and that the said Letters Patent should read as corrected below.

Column 4, line 61, for "The" read —This—; column 5, lines 16 through 33 should appear as shown below instead of as in the patent—

| | |
|---|---|
| Transistor 14 | 2N94A (N-P-N) |
| Transistor 15 | 2N94A (N-P-N) |
| Transistor 40 | 2N94A (N-P-N) |
| Battery 33 | +10 volts |
| Battery 32 | −10 volts |
| Battery 27 | −10 volts |
| Battery 45 | +2 volts |
| Battery 54 | −2 volts |
| Resistor 34 | 2,700 ohms |
| Resistor 35 | 2,700 ohms |
| Resistor 36 | 30,000 ohms |
| Resistor 31 | 620 ohms |
| Resistor 38 | 1,000 ohms |
| Resistor 26 | 10,000 ohms |
| Resistor 46 | 3,000 ohms |
| Capacitor 39 | 510 micro-microfarads |
| Capacitor 28 | 1 microfarad |
| Inductor 50 | 5 milli-henries |

Signed and sealed this 29th day of April 1958.

[SEAL]

Attest:

KARL H. AXLINE, ROBERT C. WATSON,

*Attesting Officer.* *Commissioner of Patents.*